(12) United States Patent
Englund

(10) Patent No.: US 7,568,092 B1
(45) Date of Patent: Jul. 28, 2009

(54) SECURITY POLICY ENFORCING DHCP SERVER APPLIANCE

(75) Inventor: Pär Martin Englund, Stockholm (SE)

(73) Assignee: Sun Microsystems, Inc., Santa Clara, CA (US)

( * ) Notice: Subject to any disclaimer, the term of this patent is extended or adjusted under 35 U.S.C. 154(b) by 855 days.

(21) Appl. No.: 11/054,218

(22) Filed: Feb. 9, 2005

(51) Int. Cl.
*G06F 9/24* (2006.01)

(52) U.S. Cl. .................. 713/150; 713/168; 713/182; 380/255; 380/270; 380/258

(58) Field of Classification Search ............... 713/150, 713/168, 182; 380/255, 270, 258
See application file for complete search history.

(56) References Cited

U.S. PATENT DOCUMENTS

| 4,969,184 | A | * | 11/1990 | Gordon et al. ......... 379/100.13 |
| 5,212,724 | A | * | 5/1993 | Nazarenko et al. ......... 455/560 |
| 5,379,448 | A | * | 1/1995 | Ames et al. ............... 455/524 |

* cited by examiner

*Primary Examiner*—Thomas R Peeso
(74) *Attorney, Agent, or Firm*—Osha • Liang LLP

(57) ABSTRACT

A method of allowing a remote device connected to a first network to access a second network, including leasing a leased network address to the remote device, where the leased network address allows the remote device access to the first network for a pre-defined time period, submitting at least one identification token from the remote device to an appliance within the first network, validating the at least one identification token within the pre-defined time period, and connecting the remote device to the second network if the validating is successful.

22 Claims, 3 Drawing Sheets

SECURITY POLICY ENFORCING DHCP SERVER APPLIANCE

BACKGROUND

With the increase in the number of employees working remotely and employees connecting to the corporate network using multiple devices, modern corporate network infrastructures are increasingly becoming more flexible in design, especially in the area of remote connectivity. With this flexibility, security concerns about unauthorized access to the corporate network, traceability of remote users, and maintaining system-wide compliance are emerging In an attempt to address security concerns, many corporate networks are configured to use Dynamic Host Configuration Protocol (DHCP) for dynamically assigning network addresses, such as internet protocol (IP) addresses, to connected devices. Examples of connected devices within the corporate network may include fixed systems or remote systems. Fixed systems include devices such as desktop computers, servers, and printers. Remote systems include removable, wireless, and mobile devices such as laptops and personal digital assistants (PDAs). An IP address uniquely identifies the connected device (e.g., a client computer, PDA, server, printer, etc.) that is making use of the Internet. The IP address is used to direct data or communications to a particular connected device. For example, the data a web browser retrieves and displays when a user accesses a web site on the Internet is routed to that particular device based on its IP address. One task of a DHCP server is to assist in the problem of getting a functional and unique IP number to a device on the network.

In large networks, a server may not have exact information about a particular connected device until that computer requests the information. A laptop or other portable device is not typically connected continuously to a network. Therefore, such a device only needs an IP address while it is connected to the network. DHCP is a protocol that dynamically allocates information such as IP addresses to allow a device connected to a given network to use a unique IP address while the device is connected. DHCP may also enable host computers on a network to extract network configuration information automatically from one or more servers as they boot. DHCP may simplify the administration of a large network, where registration of every connected device is not feasible, or where some devices are connected only a fraction of the time.

A DHCP server typically requests a device's Media Access Control (MAC) address to uniquely identify it when assigning IP addresses. A MAC address is a six byte long number unique to any device that is connected to a network. While a MAC address uniquely identifies a particular network device, it typically includes no indication of where that particular device is located or who is using the device.

As an example illustrating the use of DHCP, a client computer attempting to connect to a corporate network may search for a DHCP server by broadcasting a message across the network. The message includes a unique identifier, which is typically derived from the client's MAC address. After determining the client's network, a DHCP server selects an available IP address for the client. An offer message is then returned to the client from the DHCP server, which includes information such as the selected IP address and services that can be configured for the client. As more than one server may send information to a given client computer, each server reserves its selected IP address for the client until a determination is made that the client will use the IP address.

If the client computer is sent offers from multiple prospective servers, the client selects the best offer based on the number and type of services offered, and broadcasts a request specifying the IP address of the server that made the best offer. In this manner, other servers that may have reserved and offered IP addresses can cancel the reservations. The selected server then allocates the reserved IP address for the client and sends an acknowledgement to the client. The client can then test the IP address and continue booting to join the network. Typically, an IP address is "leased" to a client computer; thus, it is necessary for the client to request an increase in the lease time at regular intervals. If the renewal request is accepted by the server, the client may continue to use the network for the specified lease period. When the client no longer needs its IP address, it notifies the server that it is releasing the IP address. The IP address is then free for the server to allocate to another client system when a request is made. Accordingly, the server is able to use a smaller pool of IP addresses than would be needed if all clients were assigned a permanent IP address.

A DHCP network is often not concerned about who may connect to a DHCP network, where the user is located, and the configuration of the device connecting to the DHCP network. This can provide flexibility for users of portable devices, who can easily connect their systems to a DHCP network. Unauthorized users may be prevented from accessing a DHCP network by requiring a pre-registered MAC address to access the network. However, a MAC address can easily be forged by an unauthorized user. Additionally, as noted above, it may not be feasible to pre-register all devices on a large network. Typically, a server logs only a small amount of information from a connected portable device, such as a MAC address. Thus, it may only be possible to determine a time span and a switch port in which an unauthorized device is connected to a network.

Another tool used to address security concerns in a corporate networks is a firewall. A firewall is a system designed to prevent unauthorized access to or from a network. Firewalls may be implemented in hardware or software, or in a combination of hardware and software.

A firewall is located at the entry/exit point of the networked system it is intended to protect; thus, the firewall is the initial filter for incoming network traffic and the final processor of outgoing traffic. Firewalls are frequently used to prevent unauthorized Internet users outside of the firewall from accessing networks or hosts inside the firewall. The firewall examines the network traffic and blocks information that does not meet specified security criteria. A number of techniques exist for firewalls to protect networks, which may be used individually or in combination. For example, packet filtering is a common technique where the protocol and address information of each packet of Internet traffic is examined by the firewall. Each packet is then accepted or rejected based on user-defined rules.

SUMMARY

In general, in one aspect, the invention relates to a method of allowing a remote device connected to a first network to access a second network. The method comprises leasing a leased network address to the remote device, wherein the leased network address allows the remote device access to the first network for a pre-defined time period, submitting at least one identification token from the remote device to an appliance within the first network, validating the at least one identification token within the pre-defined time period, and connecting the remote device to the second network if the validating is successful.

In general, in one aspect, the invention relates to a network system. The network system comprises a remote device connected to a first network configured to submit at least one identification token and an appliance connected to the first network and the second network configured to lease a leased network address to the remote device, wherein the leased network address allows the remote device access to the first network for a pre-defined time period, validate the at least one identification token within the pre-defined time period, and connect the remote device to the second network if the validating is successful.

In general, in one aspect, the invention relates to an appliance. The appliance comprises a source code module configured to lease a network address to a remote device connected to a network for a pre-defined time period and validate an identification token received from the remote device, and a network interface configured to connect the remote device to a second network if the source code module validates the identification token.

In general, in one aspect, the invention relates to a computer readable medium. The computer readable medium comprises software instructions for allowing a remote device connected to a first network to access a second network, wherein the software instructions comprise functionality to lease a leased network address to the remote device, wherein the leased network address allows the remote device access to the first network for a pre-defined time period, validate the at least one identification token within the pre-defined time period, and connect the remote device to the second network if the validating is successful.

Other aspects of the invention will be apparent from the following description and the appended claims.

DETAILED DESCRIPTION

Figure 1:
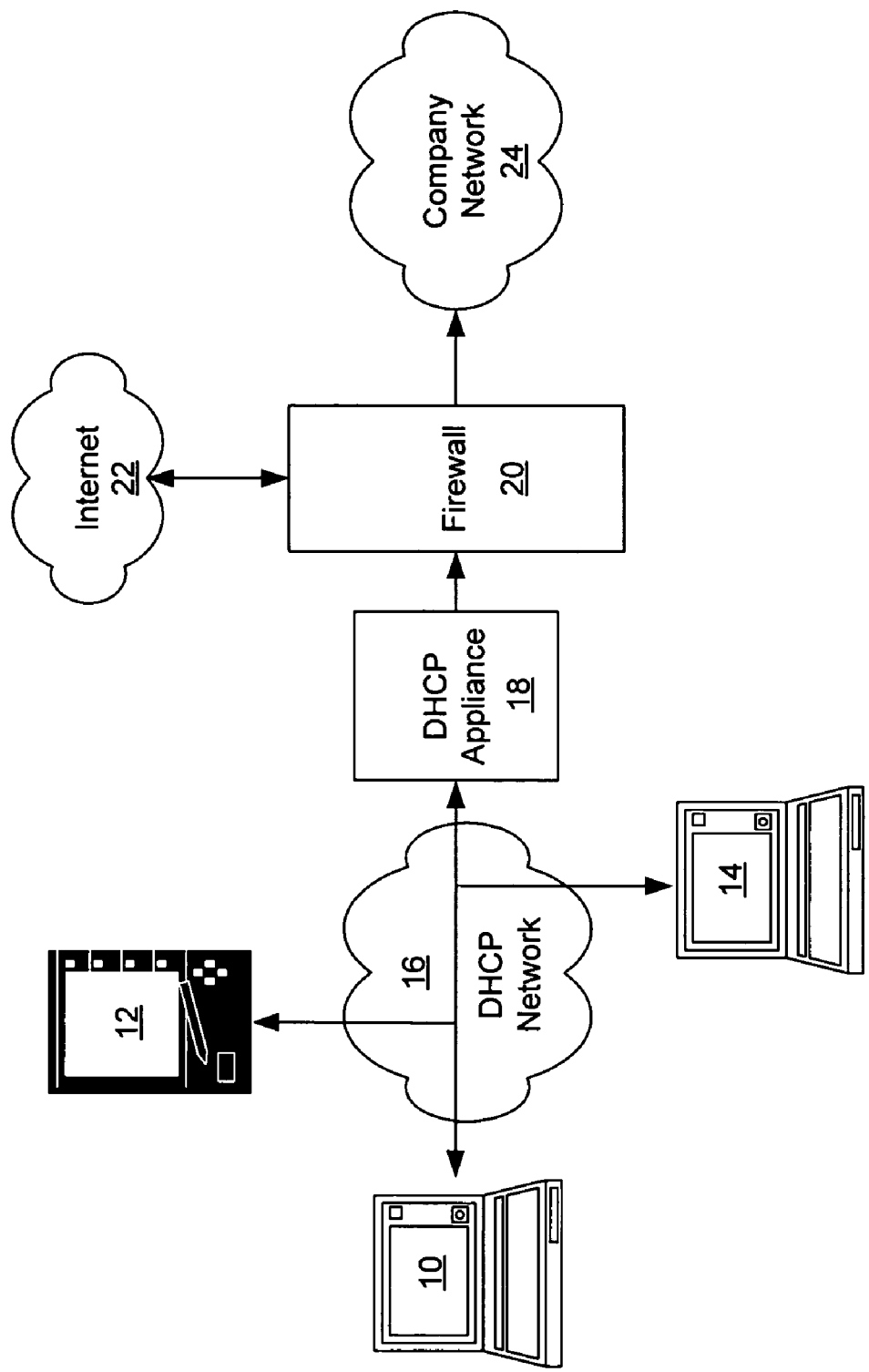
FIG. 1 shows a network diagram in accordance with an embodiment of the present invention.

Exemplary embodiments of the invention will be described with reference to the accompanying drawings. Like elements in the various figures are denoted by like reference numerals for consistency. Further, the use of "ST" in the drawings is equivalent to the use of "Step" in the detailed description below.

In the following detailed description of the invention, numerous specific details are set forth in order to provide a more thorough understanding of the invention. In other instances, well-known features have not been described in detail to avoid obscuring the invention.

In general, embodiments of the invention relate to allowing a device access a network. Specifically, embodiments of the invention relate to connecting a device to a network if the device is validated within a pre-defined time period. Further, embodiments of the invention relate to an appliance with a source code module configured to allow a device to access a network and the device to connect to the network using a network interface if the device is validated within a pre-defined time period.

FIG. 1 shows a network system in accordance with one embodiment of the invention. The network system includes a DHCP network (16) and a company network (24), as well as the capability to connect to a Wide Area Network (WAN), such as the Internet (22). One or more devices, such as laptops (10, 14), a PDA (12), etc., may be connected to the DHCP network (16). While the connected devices shown in FIG. 1 are remote devices, one skilled in the art will appreciate that any device that may be assigned an internet protocol (IP) address may be connected to the DHCP network, such as PDAs, laptops, fixed desktop computers, printers, projection equipment, servers, etc.

In one or more embodiments of the invention, the DHCP network (16) (and the connected devices associated with the network (e.g., laptop (10), PDA (12)) communicates with a DHCP appliance (18) to access the company network (24). The devices connected to the DHCP network (16) are unable to access the company network without first communicating with the DHCP appliance (18).

In one or more embodiments of the invention, the DHCP appliance (18) performs the tasks of a typical DHCP server as described above, such as assisting devices connected to the DHCP network (16) by securing a functional and unique IP address. In one or more embodiments of the invention, the DHCP appliance (18) is considered a firewall appliance placed between the DHCP network (16) and the company network (24). In one or more embodiments of the invention, the DHCP appliance (18) is a platform independent appliance that requires no installation prior to connecting to the network. Additional functionality of the DHCP appliance (18) is discussed below.

In one or more embodiments of the invention, a firewall (20) is located between the DHCP appliance (18) and other networks, such as a local area network (LAN) (e.g., a company network (24)) and a wide area network (WAN) (e.g., the Internet (22)). The firewall (20) is a set of related programs and/or hardware, often located at a singular check point in a network system, that protects the resources of a private network (such as company network (24)) from users from other networks. Further, in one or more embodiments of the invention, the firewall (20) may be a stand-alone component of the network system or may be incorporated as part of another component of the system, such as the DHCP appliance (18), or vice-versa.

Figure 2:
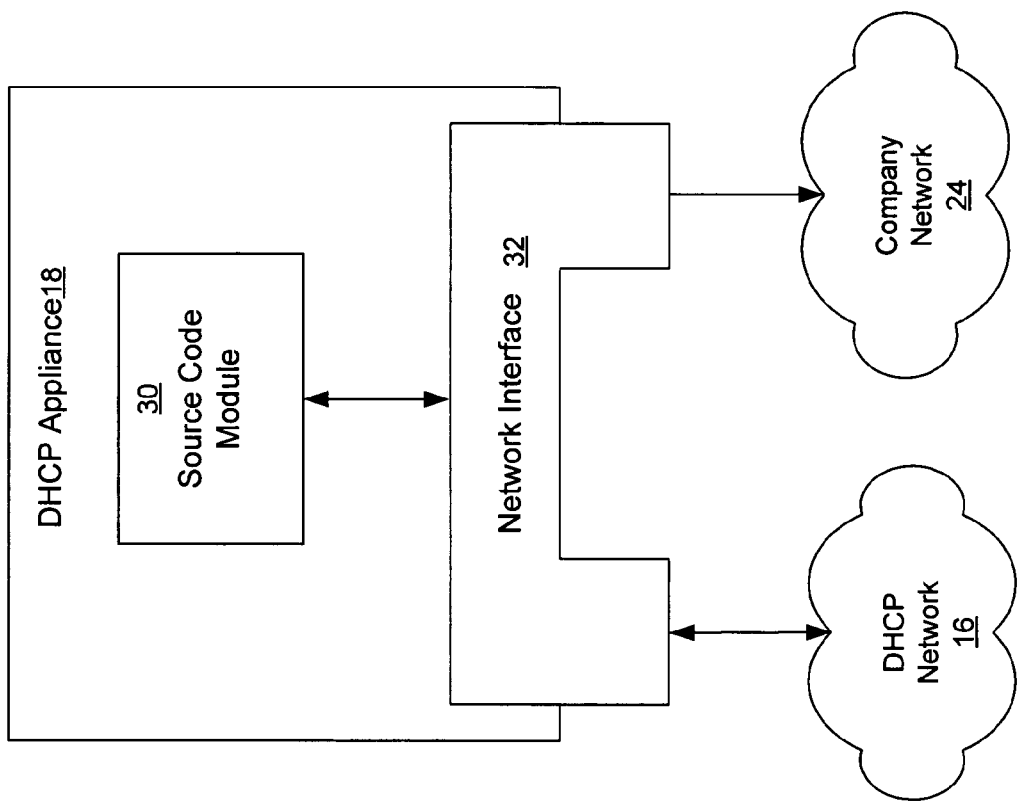
FIG. 2 shows a flow diagram in accordance with an embodiment of the present invention.

FIG. 2 shows a flow diagram in accordance with an embodiment of the present invention. In one or more embodiments of the invention, a DHCP appliance (18) may include a source code module (30) for performing various tasks associated with the functionality of the DHCP appliance (18). Such tasks may include validating an identification token and/or verifying compliance of a connected device with established security (or best practices) standards set by the administrator of a company network that is attempted to be accessed. In one embodiment of the invention, this information may be stored in the DHCP appliance (18).

One skilled in the art will appreciate that the source code module (30) may be implemented as a Java™ applet accessed via a web browser, which is accessed as part of an authentication process. In one embodiment of the invention, the applet may be transmitted to the user's device to verify compliance of the device. In one or more embodiments of the invention, the applet that performs the compliance verification, may also be used to detect when the device is disconnected from the network. In one or more embodiments of the invention, the source code module (30) in the DHCP appliance (18) polls the applet running on the device and checks whether the device is still active (using a secure method). Once the applet no longer responds, the network access for the IP address is revoked and the firewall is closed for the revoked IP address.

Continuing with FIG. 2, in one or more embodiments of the invention, a network interface (32), in conjunction with the source code module (30), may lease a network address to the device on the DHCP network (16), and further (upon proper verification and validation) allow the device to connect to a secured network, such as a company network (24). One skilled in the art will appreciate that the network interface (32) may use one or more network protocol (e.g., Transmission control protocol (TCP), Internet Protocol (IP), Hypertext Transfer Protocol (HTTP), File Transfer Protocol (FTP), Border Gateway Protocol (BGP), etc.) and various types of security mechanisms (e.g., encoding, encryption, etc.) to maintain the security of the secured network. Further, while the network interface is shown as residing on the DHCP appliance (18) in FIG. 2, portions of the network interface (32) may exist across multiple components in a network system.

Figure 3:
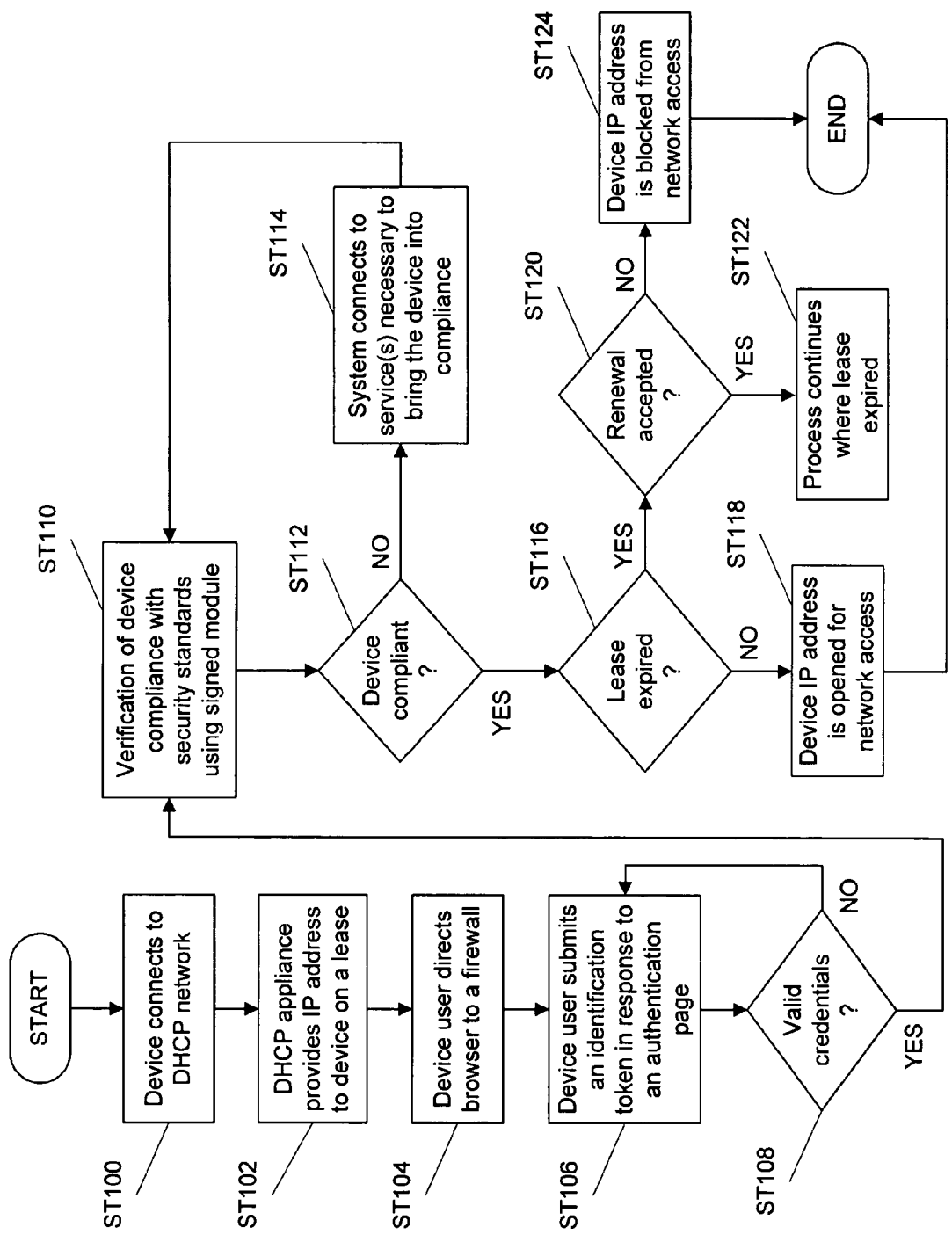
FIG. 3 shows a flow chart in accordance with an embodiment of the present invention.

FIG. 3 shows a flowchart in accordance with an embodiment of the present invention. Initially, a device, such as a remote device (e.g., a laptop, a PDA, a presentation device, etc.), connects to a DHCP network (ST100). In one or more embodiments of the invention, a DHCP appliance, which is connected to the DHCP network, leases an IP address to the device for a pre-defined time period (ST102). For example, in one or more embodiments of the invention, the DHCP appliance may lease an IP address to a wirelessly connected laptop for up to 5 minutes. One skilled in the art will recognize that this time period may be changed based on any number of criteria. Within this time period, user credentials may be verified and the laptop may be checked for compliance with established security standards and best practices requirements as described in greater detail below. Further, one skilled in the art will recognize that this time period may be periodically tuned to ensure the pre-defined security standards are meet.

In one or more embodiments of the invention, the user is instructed to open a web browser and directs the browser to a firewall (ST104). In one or more embodiments of the invention, this process may be performed seamlessly where the user is only required to answer a series of questions and the connection between the user's device and the firewall is established. Further, while a web browser is specifically mentioned as the mechanism to access the firewall, one skilled in the art will appreciate that any mechanism that can direct a user to (or gain access to) a firewall would suffice.

In one or more embodiments of the invention, the user attempting to access the network submits an identification token to the firewall for validation (in response to an authentication page on the web browser discussed in ST104, which requests information from the user) (ST106). The identification token may be, for example, a user name and password, identification stored on a smart card to be read by a smart card reader, fingerprint information read by a fingerprint reader, other biometric data, or one of many other possible tokens. One skilled in the art will recognize that the identification tokens discussed are not meant to limit the present invention; rather, the tokens are intended to show that the while a given identification token is unique, the type of identification token submitted and the method by which the identification token is submitted are not unique.

In one or more embodiments of the invention, a user may have an identification token that is recognized as a safe identification token. For example, it may be necessary for a network administrator to have immediate access to a network service, even when it would not normally be allowed. In such a situation, the server may recognize the identification token, and may then alter the required security standards or altogether bypass verification of the required security standards. The network access levels granted to the user in such a situation may also need to be adjusted.

In one or more embodiments of the invention, a one-time use or limited use identification token may be created to allow a user to access some portion of a network that would not normally be allowed. For example, it may be necessary for a third party vendor to have remote network access on a company network in order to update software on the network. An identification token with a limited number of uses or a limited number of renewals may be created for the vendor that allows limited access to the network (and/or access for a limited time). Additionally, access based on the identification token may be restricted in other manners, such as to a particular time period, to a limited number of necessary resources, to a particular security level, etc. Further, access based on the identification token may additionally restrict network access for users attempting to access the network during a sensitive period for the network (i.e., network maintenance is being performed, a particularly sensitive user is accessing the network, the firewall is being disabled, etc.) to avoid damage to the network or the user's device.

Continuing with FIG. 3, if validating the identification token is successful (i.e., the identification token is validated) (ST108), the firewall may verify compliance of the laptop with established network security standards (ST110). For example, in one or more embodiments of the invention, based on the operating system or level of user authenticated, the user's device may receive a signed Java™ applet that verifies the presence of required software, system settings, updates, hardware, etc. For example, the applet may verify the presence of a personal firewall, the presence of the latest version of antivirus software (and if all updates are installed), the security settings of a mail package being set to the highest level, etc. A different device or user may have differing levels of compliance and/or standards required before access to the company network is allowed.

Required security standards may be established in a number of ways. For example, in one or more embodiments of the invention, the time of day or day of the year that the user attempts to access the network may alter the security standard. If the user is registered as normally accessing the network during weekday mornings, for example, the network may establish security standards that are more stringent than normally required for the user, or the user may not be allowed to access the network. In other embodiments, the required security standards may be established in whole or in part by factors such as the user identification token submitted (e.g., a smart card versus a biometric scan), the operating system of the remote device, or hardware that is used by or is a part of the device. In one or more embodiments of the invention, the security criteria may also be scaled based on some other factors. For example, a network administrator may have less stringent security standards as well as greater network access privileges than a guest account.

If the identification token is not validated (i.e., the validation is unsuccessful) (ST108), the process returns to ST106 until the user is authenticated or the system times out (e.g., the user exceeds the number of attempts allowed).

If verification of the device compliance is not successful (i.e., does not meet the established security standards or best practices goals) (ST112), the system may allow the user limited access to services to download patches and updates for the device, as necessary to put the device into compliance (ST114). For example, if the user is defined as having the opportunity to manually change and update the settings of the remote device, but chooses not to, the server may revoke the lease of the IP address at the end of the lease period. In one embodiment of the invention, the server may automatically update the device to comply with established security standards. Alternatively, the server may revoke the lease of the IP address and exclude the device from the network.

If the device is deemed compliant (ST112), a determination is made whether the lease of the IP address in ST102 has expired (ST116). Generally speaking, at some time before the lease period expires, the DHCP appliance may renew the lease of the IP address to allow the user continued access. If the renewal accepted (ST120), the process continues where the lease expired (ST122). Otherwise, at some time the DHCP lease may not be renewed and the IP address of the device is blocked from network access (ST124). However, the firewall may still allow the device access to the DHCP appliance. When the lease for the IP address is not renewed, the IP address is returned to a list of IP addresses available for lease.

If the device is deemed compliant (ST110) and the lease has not expired (ST116) (or renewal of the lease was allowed (ST120)), the firewall opens the IP address leased to the device for access to the network behind the firewall (ST118). The level of access to the network is defined by the access privileges of the user. For example, the user may be permitted at this time to access a company network or the Internet. In one or more embodiments of the invention, the firewall continues to allow the user access based on the lease until the lease period expires (and is not renewed). Once the DHCP lease expires (or is not renewed), the firewall blocks the IP address of the device from all network access (except the DHCP appliance). To restore network access the user of the device is required to repeat the process starting at ST102.

In one or more embodiments of the invention, detecting whether a user has disconnected a device from the network may be performed by the DHCP appliance, as discussed above. As a result, a user may safely disconnect the device from the network before the end of the pre-defined time period.

In one or more embodiments of the invention, a user may attempt to access the network from a network location that has a special identifier. For example, a network administrator or "superuser" may submit a user name and password from a location that is recognized as a safe location. In such a situation, the server may recognize the location, and may then alter the required security standards or altogether bypass verification of the required security standards. The server may additionally alter the network access levels granted in such a situation.

Further, after an identification token has been validated and compliance with network security standards has been verified for a device, information related to the remote device's session may be saved on the network in accordance with one or more embodiments of the invention. For example, the IP address leased to the device, the MAC address used to identify the device, as well as any identification tokens submitted to the server may be stored locally or in a central repository, such as a secure server.

Such information may be used to allow the server to dynamically adjust in response to a number of scenarios. For example, if the same MAC address or identification token is present in more than one location on the network, the server may revoke the lease of the IP address to any devices sharing the MAC address or identification token, as one or more of the devices may have been compromised. Alternatively, if a particular identification token is repeatedly validated on one or more networks, access for that particular user token may be denied, or a network administrator may be notified to contact the individual user to verify that the user is repeatedly attempting to gain network access. Alternatively, if a single MAC address is used repeatedly with multiple identification tokens, the remote device with that particular MAC access may be denied network access. One skilled in the art will recognize the server or network administrator may respond in other ways and that the scope of the present invention should not only be limited to the examples listed above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of allowing a remote device connected to a first network to access a second network, comprising:
   leasing a leased network address to the remote device, wherein the leased network address allows the remote device access to the first network for a pre-defined time period;
   submitting at least one identification token from the remote device to an appliance within the first network;
   validating the at least one identification token within the pre-defined time period;
   connecting the remote device to the second network if the validating is successful;
   verifying compliance of the remote device with pre-defined security standards; and
   connecting the remote device to a service to bring the remote device into compliance if the remote device does not meet the pre-defined security standards.

2. The method of claim 1, further comprising:
   revoking the leased network address if the validating is not successful within the pre-defined time period.

3. The method of claim 1, further comprising:
   extending the pre-defined time period when a renewal of the leased network address is accepted.

4. The method of claim 1, further comprising:
   polling the remote device using the appliance to determine whether the remote device is active; and
   disconnecting the remote device from the second network if the remote device is not active, wherein the disconnecting comprises revoking the leased network address and closing the firewall for the leased network address.

5. The method of claim 1, wherein a level of access granted to the remote device for the second network is dependent on at least one of the group consisting of the at least one identification token submitted, when the at least one identification token is submitted, the remote device, hardware associated with the remote device, and an operating system of the remote device.

6. The method of claim 1, wherein the pre-defined period is five minutes.

7. The method of claim 1, wherein the appliance executes on a plurality of platforms.

8. A network system, comprising:
   a remote device connected to a first network configured to submit at least one identification token, and
   an appliance connected to the first network and the second network configured to:
      lease a leased network address to the remote device, wherein the leased network address allows the remote device access to the first network for a pre-defined time period;
      validate the at least one identification token within the pre-defined time period; and
   connect the remote device to the second network if the validating is successful, wherein the appliance comprises a Dynamic Host Configuration Protocol server.

9. The network system of claim 8, further comprising:
a network interface configured to verify compliance of the remote device with pre-defined standards.

10. The network system of claim 9, wherein the appliance is further configured to:
revoke the leased network address if the network interface does not verify compliance of the remote device.

11. The network system of claim 8, wherein the appliance is further configured to:
extend the pre-defined time period when a renewal of the leased network address is accepted.

12. The network system of claim 8, wherein the appliance is further configured to:
connect the remote device to a service to bring the remote device into compliance if the remote device does not meet the pre-defined security standards.

13. The network system of claim 8, wherein the appliance is further configured to:
poll the remote device using the appliance to determine whether the remote device is active; and
disconnect the remote device from the second network if the remote device is not active, wherein the remote device is disconnected by revoking the leased network address and closing the firewall for the leased network address.

14. The network system of claim 8, wherein a level of access granted to the remote device for the second network is dependent on at least one of the group consisting of the at least one identification token submitted, when the at least one identification token is submitted, the remote device, hardware associated with the remote device, and an operating system of the remote device.

15. The network system of claim 8, wherein the appliance is further configured to:
revoke the leased network address if the appliance does not validate the at least one identification token.

16. The network system of claim 8, wherein the pre-defined period is five minutes.

17. The network system of claim 8, wherein the appliance executes on a plurality of platforms.

18. An appliance, comprising:
a source code module configured to:
lease a network address to a remote device connected to a network for a pre-defined time period;
validate an identification token received from the remote device; and
poll the remote device to determine whether the remote device is active; and
a network interface configured to connect the remote device to a second network if the source code module validates the identification token.

19. The appliance of claim 18, wherein the source code module is further configured to verify compliance of the remote device with pre-defined standards.

20. The appliance of claim 18, wherein the network interface is furthered configured to:
disconnect the remote device from the second network if the remote device is not active, wherein the remote device is disconnected by revoking the leased network address and closing the firewall for the leased network address.

21. A computer readable medium comprising software instructions for allowing a remote device connected to a first network to access a second network, wherein the software instructions comprise functionality to:
lease a leased network address to the remote device, wherein the leased network address allows the remote device access to the first network for a pre-defined time period;
validate the at least one identification token within the pre-defined time period; and
connect the remote device to the second network if the validating is successful.

22. The computer readable medium of claim 21, further comprising software instructions to verify compliance of the remote device with pre-defined standards.

\* \* \* \* \*